(12) United States Patent
Chakrabarty et al.

(10) Patent No.: US 8,219,519 B2
(45) Date of Patent: Jul. 10, 2012

(54) TEXT EXTRACTION FOR DETERMINING EMERGING ISSUES IN VEHICLE WARRANTY REPORTING

(75) Inventors: Sugato Chakrabarty, Bangalore (IN); Martin Case, Warren, MI (US); Michael Golinski, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 300 days.

(21) Appl. No.: 12/710,518

(22) Filed: Feb. 23, 2010

(65) Prior Publication Data

US 2011/0208742 A1   Aug. 25, 2011

(51) Int. Cl.
*G06F 17/30* (2006.01)
(52) U.S. Cl. ....................................................... 707/602
(58) Field of Classification Search .................. 707/602, 707/609; 701/29
See application file for complete search history.

(56) References Cited

U.S. PATENT DOCUMENTS

| 5,541,840 | A | 7/1996 | Gurne et al. |
| 6,055,494 | A | 4/2000 | Friedman |
| 6,278,996 | B1 | 8/2001 | Richardson et al. |
| 6,311,162 | B1 | 10/2001 | Reichwein et al. |
| 6,389,561 | B1 | 5/2002 | Bluvband |
| 6,609,050 | B2 * | 8/2003 | Li .................................. 701/29.6 |
| 6,768,935 | B1 | 7/2004 | Morgan et al. |
| 6,882,961 | B2 | 4/2005 | Cobble et al. |
| 7,092,837 | B1 | 8/2006 | Lanier et al. |
| 7,216,052 | B2 | 5/2007 | Fountain et al. |
| 7,343,213 | B1 | 3/2008 | Burgess et al. |
| 7,912,772 | B2 * | 3/2011 | Whear et al. .................... 705/35 |
| 2002/0128874 | A1 | 9/2002 | McIntosh et al. |
| 2003/0099402 | A1 | 5/2003 | Baylis |
| 2004/0186705 | A1 | 9/2004 | Morgan et al. |
| 2007/0083300 | A1 | 4/2007 | Mukheriee |
| 2008/0243488 | A1 * | 10/2008 | Balmelli et al. ................ 704/10 |

* cited by examiner

*Primary Examiner* — Thu-Nguyet Le

(57) ABSTRACT

A method is provided for detecting trends in service repairs for vehicles. Service repair verbatims are accessed from a warranty database that includes information relating to an identified concern with the vehicle. A thesaurus of service repair related terms is provided. The service repair related terms are each associated with at least one of a component category, a concern category, a cause category, and a correction of repair category. Key terms are identified in each service repair verbatim that have an association with the service repair related terms in the thesaurus. The key terms are extracted from each of the service repair verbatims. A user selectively generates a report based on a key term in the component category and at least one other key term from at least one other category. The report identifies an aggregate number of service repair verbatims associated with the key terms selected by the user.

20 Claims, 3 Drawing Sheets

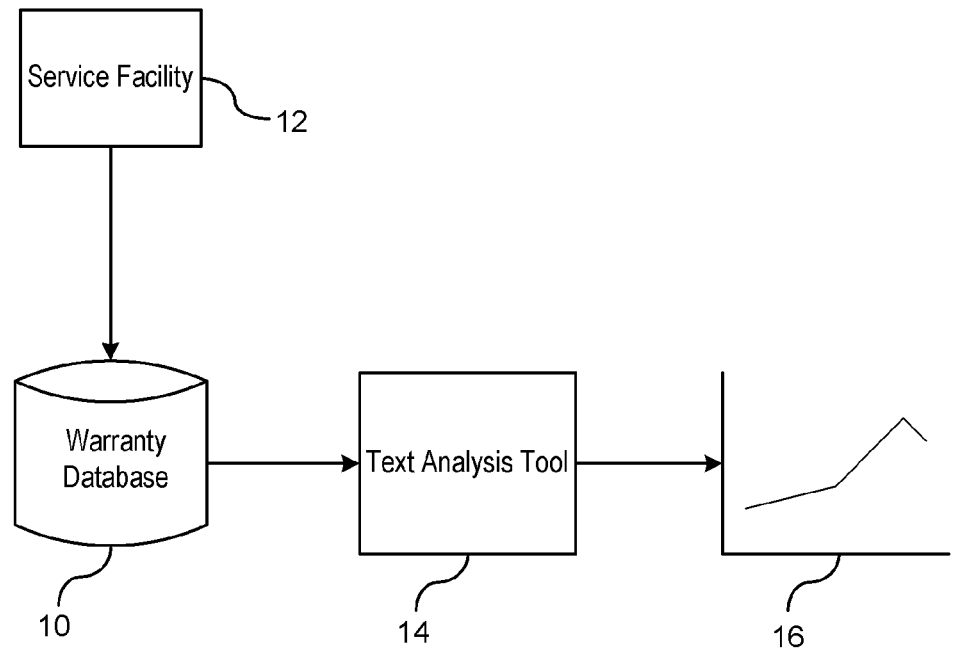

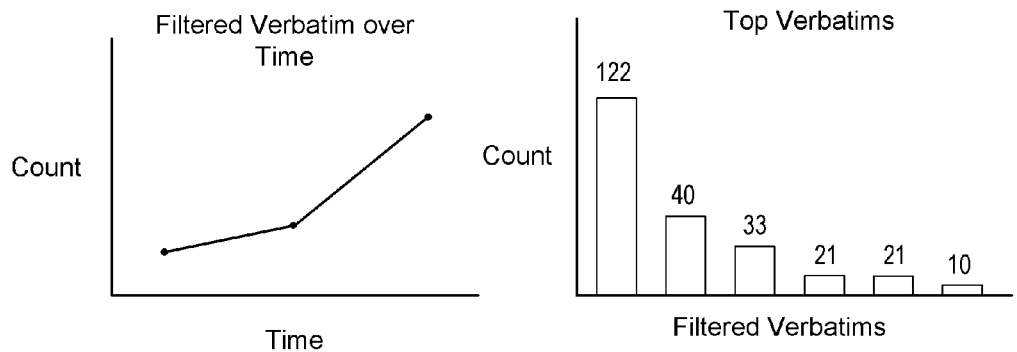
Fig. 4a
Fig. 4b
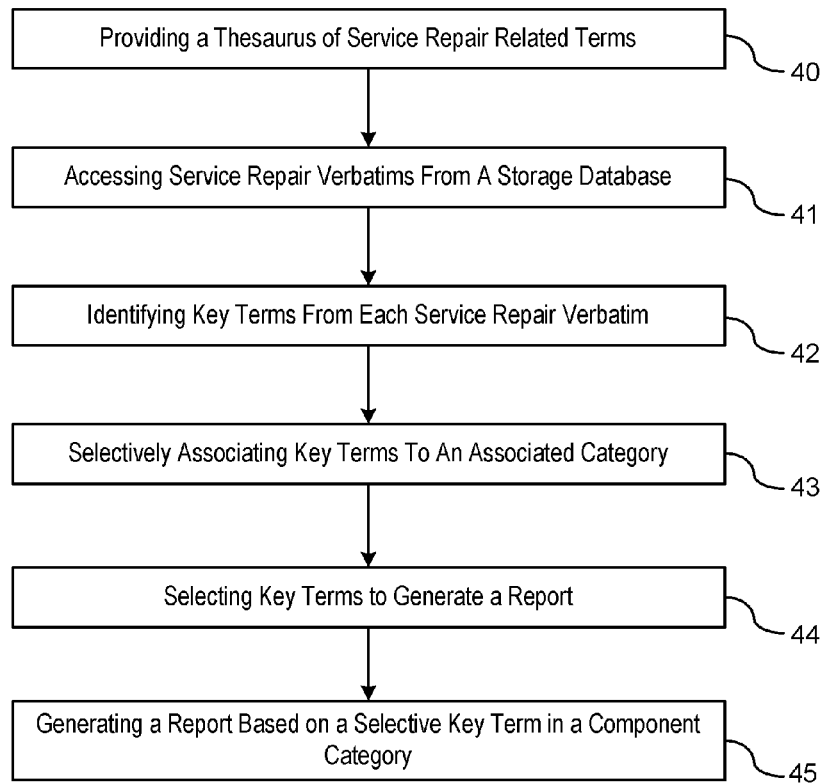
Fig. 5

TEXT EXTRACTION FOR DETERMINING EMERGING ISSUES IN VEHICLE WARRANTY REPORTING

BACKGROUND OF INVENTION

An embodiment relates generally to identifying trends in the service repair data.

Vehicle warranty reporting typically uses labor codes to determine issues with a vehicle repair made at a vehicle service facility. The labor codes have predefined descriptions which cannot be altered by the service technician. Therefore, the service technician must choose a best fit for the repair even though the labor code does not provide specifics of the concern, cause, or repair. The issue with using only labor codes is that the grouping of various causes of a failed part does not necessarily identify the root cause with each of the parts grouped under the labor code, and therefore, the root cause of many parts may not be identified until there exists a large number of failures in the public domain causing increased cost to the manufacturer for replacement of the parts.

SUMMARY OF INVENTION

An advantage of an embodiment is the early detection of emerging warranty repairs using identified key terms from the verbatims in a warranty database. Key terms are autonomously extracted from the service repair verbatims provided by vehicle service facilities based on a correlation to service repair related terms from a generated thesaurus. The identification and extraction of key terms from the service repair verbatims allows detailed reports to be generated as a function of the concern/complaint, cause, or correction repair. The verbatims are commentary input by service personnel at the service facilities thereby providing more details of the repair which allows a user viewing the reports to focus on the root cause of the repair.

An embodiment contemplates a method of detecting trends in service repairs for vehicles. Service repair verbatims are accessed from a warranty database. The service repair verbatims include information relating to an identified concern with the vehicle. A thesaurus of service repair related terms is provided. The service repair related terms are each associated with at least one of a component category, a concern category, a cause category, and a correction of repair category. Key terms are identified in each service repair verbatim. The identified key terms have an association with the service repair related terms in the thesaurus. The key terms are extracted from each of the service repair verbatims. The extracted key terms in each of the service repair verbatims are selectively associated to a respective one of the categories for the respective service repair verbatims. A user selectively generates a report based on a key term in the component category and at least one other key term from at least one of the other respective categories. The report identifies an aggregate number of the service repair verbatims associated with the key terms selected by the user. An emerging service issue is detected based on the key terms extracted from the service repair verbatims.

An embodiment contemplates a warranty detection system for detecting trends in service repairs of vehicles. A warranty database stores service repair verbatims. The service repair verbatims include information relating to an identified concern with the vehicle. A text analysis tool identifies key terms in each service repair verbatim. The identified key terms have an association with the service repair related terms in a thesaurus. The thesaurus includes a plurality of service repair related terms. The service repair related terms are each associated with at least one of a component category, a concern category, a cause category, and a correction of repair category. A report generating device selectively generates reports based on selected key terms in the component category and at least one other key term from at least one of the other respective categories. The text analysis tool extracts key terms from each service repair verbatim. The extracted key terms in each verbatim are associated with a respective category. The report identifies an aggregate number of service repair verbatims associated with selected key terms from the component category and the at least one other category.

BRIEF DESCRIPTION OF DRAWINGS

FIG. 1 is a block diagram of a warranty detection system for detecting trends in service repairs of vehicles.

FIG. 2 is an exemplary categorization of extracted key terms in service repair verbatims.

FIGS. 4a and 4b are exemplary graphs of generated reports.

FIG. 5 is a flowchart of a method for extracting key terms from a verbatim for identifying repair trends.

DETAILED DESCRIPTION

Figure 3:
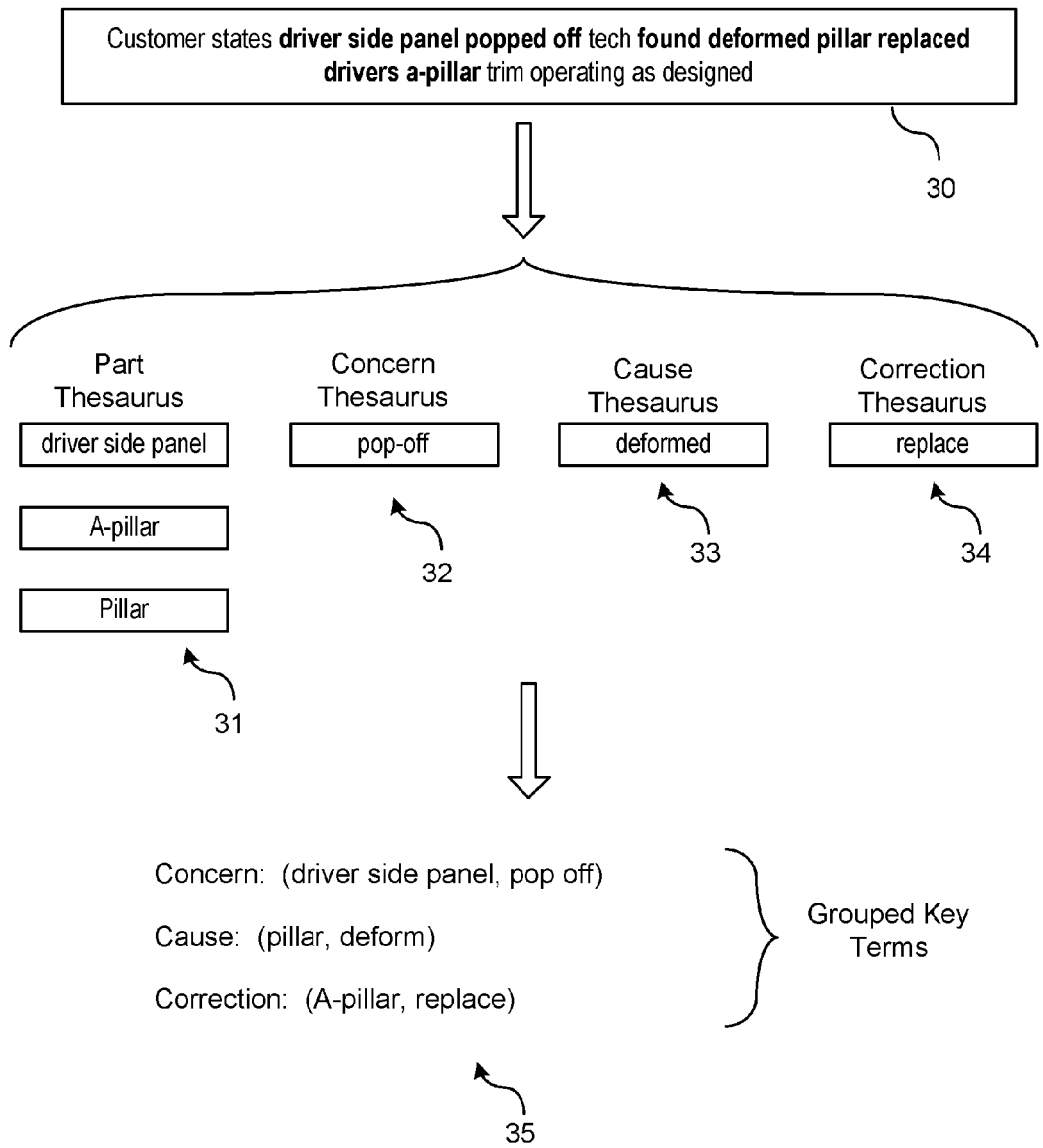
FIG. 3 is a block flow diagram illustrating an extraction and categorization of key terms from a verbatim.

There is shown in FIG. 1 a block diagram of a warranty detection system for detecting trends in service repairs of vehicles. The emerging warranty detection system includes a warranty database 10 for storing service repair verbatims provided by one or more service facilities 12, a text analysis tool 14 for extracting key terms from the service repair verbatims, and a report generator 16 for generating time trends of selected key terms.

The warranty database 10 includes a memory storage unit which stores information relating a concern and a repair of the vehicle. The warranty database 10 preferably is a central database that receives and compiles service repair verbatims from all the vehicle service facilities 12. Typically, vehicle service facilities 12, such as vehicle dealerships, upon determining the cause of a problem submit a predetermined labor code to the warranty database 10. The labor code includes a predefined description of the repair made to the vehicle. The labor code does not allow any other specifics to be recorded such as the concern reported (e.g., complaint) or the cause of the concern since the labor code has a predefined description. For example, if a labor code is submitted for a motor that states 'motor is replaced", there may be many causes that resulted in the motor being replaced (e.g., not operating, noisy, drawing high current, running slow); however, such information is not provided in the reported labor code since each labor code has only one predefined description and cannot be altered by the service technician.

In the preferred embodiment, service personnel are required to input cause, concern, and repair comments as part of the service repair verbatim. The service personnel may include the service technicians performing work on the vehicle that have direct knowledge of the repair and reasons for the failed part. The service personnel may also include service managers that discuss the concern/complaints with the customer. The service managers may add customer comments relating to the reason the vehicle is being serviced. The information (e.g., commentary) provided by the service personnel that includes a description of the failed part, the concern/complaint by the owner of the vehicle, the cause of the failed part as determined by the service technician, and the corrected repair made to the vehicle by the service technician is referred to as a service repair verbatim and is provided to the warranty database 10.

The service repair verbatim may be entered in the warranty database 10 in an unstructured format. An unstructured format may include strings of text that run together without any punctuation or capitalization, which otherwise would normally be separated by punctuations. Moreover, in the preferred embodiment, the service repair verbatim added is in an uncategorized format meaning that the service personnel are not required to enter separate service repair verbatims for each category, which will be discussed in detail later. The categories, in which the text from the verbatim will be segregated by the text analysis tool 14, include a part category, a concern category, a cause category, and a repair category. In alternative embodiments, categories may be set up within the warranty database where the service personnel are required to segregate the service repair verbatim and enter information into respective fields that represent each of the categories.

The text analysis tool 14 is an analytical tool that searches the text of the verbatim, extracts key terms from the verbatim, and categorizes the key terms so that reports may be generated based on data other than just labor codes. The text analysis tool 14 includes a thesaurus containing a plurality of service related terms. The thesaurus is made by subject matter experts having expert knowledge of each of the technologies of the vehicle. Each of the service related terms contained in the thesaurus are associated with at least one of the parts category, the concern category, the cause category, and the correction of repair category. That is, each term within the thesaurus has an association with a respective category; however, certain service related terms may be associated with more than one category.

The text analysis tool 14 when prompted by a user accesses the warranty database 10 and obtains service repair verbatims for selected criteria that is based on the user's request. The text analysis tool 14 then searches for key terms in the service repair verbatim that correspond to service repair related terms in the thesaurus. When a key term is found, the key term is extracted and selectively associated with the respective category that the service repair related terms correspond with. Preferably, each verbatim will have a key term extracted for each respective category. However, it should be understood that all categories may not have an associated key term due to insufficient input of commentary by the service personnel.

The report generator 16 generates charts or graphs for identifying an aggregate number of service repair verbatims based on the key terms selected by the user. The user as discussed herein is any person who uses the reports to identify trends and determine emerging warranty issues. The user may select a part and at least one of the key terms for generating a report. The report will typically include a time trend of the reported concern, cause, correction or combination thereof.

FIG. 2 is an exemplary table listing of the respective key terms extracted from service repair verbatims in the warranty database. Each row represents extracted key terms from a verbatim. The columns represent the respective categories that the extracted key terms are binned for the respective verbatim. That is, for a verbatim listed in the table, each key term listed in the table is analyzed by the text analysis tool and selectively categorized in the respective part, concern, cause, and correction of repair categories.

FIG. 3 is a block flow diagram illustrating the extraction and categorization process. Block 30 is an exemplary verbatim stored in the warranty database. The verbatim is entered by the service personnel into an entry system linked to the warranty database. It is shown in block 30 that the verbatim as entered is in an unstructured and uncategorized format. The unstructured format pertains to entering the text using run-on sentences without punctuation. It should be understood that service personnel may enter the verbatim in a structured or unstructured format. In either format, the text analysis tool is capable of identifying and extracting the key terms. It should also be understood that the system may be formatted in an uncategorized or a categorized format. Requiring that the service personnel segregate the verbatim into respective categories assists in reducing the computation load on text analysis tool. That is, having portions of service repair verbatims already segregated into respective categories reduces the computational time to extract the key terms since the text analysis tool only needs to search a respective segment of the service repair verbatim as opposed to searching the entire service repair verbatim.

In block 30, the text analysis tool applies analysis to the verbatim by comparing a word or phrases within the service repair verbatim with service repair related terms in the thesaurus. Key terms (i.e., words or phrases) that match the service repair related terms are shown in bold.

In block 31, those respective key terms identified in the service repair verbatim that are associated with the part category are listed therein. In the example shown, words or phrases describing the repaired part, such as the terms driver side panel, A-pillar, and pillar, that are associated with the part category are listed in the table.

In block 32, those respective key terms that are identified in the service repair verbatim that are associated with the concern category are listed therein. The concern category represents the complaint by the customer. In the example shown, words or phrases describing the concern/complaint, such as the term "pop-off" that are associated with the concern category are listed in the table.

In block 33, those respective key terms that are identified in the service repair verbatim that are associated with the cause category are listed therein. The cause category represents the root cause identified by the technician. Words or phrases describing the repaired part, such as the term "deformed" are associated with the cause category are listed in the table.

In block 34, those respective key terms from the verbatim that are identified in the service repair verbatim that are associated with the repair of correction category are listed therein. The correction category represents the repair as described by the technician. Words or phrases describing the repaired part, such as the term "replace" are associated with the correction category and listed in the table.

Block 35 illustrates the grouping of the key terms in the concern, cause, and correction categories with the associated part listing from the part category. The combinations as shown may be selected to generate reports for identifying emerging trends in warranty data. In current warranty reporting systems, reports would be generated based on a labor code where the labor code describes a general repair such at replacing the pillar. The resulting report would show the aggregate number of claims made for that labor code. Specifics as to the cause, concern, or complaint would have no or little detail. If extra details are required, then follow-ups with the service facility or calls to the vehicle owner would be required. Referring again to block 35, a user could generate a report that identifies those combination of key words extracted and analyzed by the text analysis tool to provide a different analytical review of warranty data for detecting emerging issues. For example, a report could be generated identifying complaints made with the driver side panel popping off, or reports can be generated identifying complaints made regarding pillar deformation, or reports could be made identifying repairs where the A-pillar was replaced. Examples of generated reports are shown in FIG. 4a and FIG. 4b. FIG. 4a illustrates an aggregate number of repairs over a specified time period. The number of repairs represents the filtered repairs based on the selected key words entered by the user. FIG. 4b illustrates a bar chart showing the filtered verbatims having the highest aggregate number of claims over a respective time period. Each bar in the chart may represent the same repair but may provide different cause for the repair. Examples of the different bars for a same repair may include the A-pillar cracked, the A-pillar warped, the A-pillar rusting. In addition, other combination of reports could be generated using a combination of key terms from more categories than that shown in block 35. It is understood that the advantage as described herein is the extraction of key terms from the claims identifying pertinent terms and the ability to search one or a combination of any of the extracted key terms which would be helpful in analyzing and detecting emerging issues in warranty claims.

FIG. 5 illustrates a flowchart for a method of extracting key terms from a service repair verbatim for identifying repair trends. In step 40, a thesaurus of service related repair terms are provided. The thesaurus of service related terms are compiled by, but not limited to, subject matter experts, technicians, warranty personnel, engineers, field service personnel, and technical specialists.

In step 41, service repair verbatims are accessed from the warranty database via the text analysis tool.

In step 42, the service repair verbatim is analyzed and key terms within the service repair verbatim are identified. The key terms are identified by having a correlation with service related terms of the thesaurus.

In step 43, the text analysis tool associates the key terms with the respective categories pertaining to the corresponding service related terms.

In step 44, the key terms from at least one category are used to generate a warranty report. The user will select key terms from at least one category for sorting through the service repair verbatims and obtaining the respective verbatims that meet the selected requirements.

In step 45, a report is generated that provides an aggregate number of service repair verbatims based on the selected key terms by the user. The service repair verbatims may be sorted differently using different key terms which provides the user different analytical perspectives for the sorted data for detecting emerging trends.

While certain embodiments of the present invention have been described in detail, those familiar with the art to which this invention relates will recognize various alternative designs and embodiments for practicing the invention as defined by the following claims.

What is claimed is:

1. A method of detecting trends in service repairs for vehicles comprising:
    accessing service repair verbatims from a warranty database, the service repair verbatims including information relating to an identified concern with the vehicle;
    providing a thesaurus of service repair related terms, the service repair related terms each being associated with at least one of a component category, a concern category, a cause category, and a correction of repair category;
    identifying key terms in each service repair verbatim, the identified key terms having an association with the service repair related terms in the thesaurus;
    extracting the key terms from each of the service repair verbatims;
    selectively associating the extracted key terms in each of the service repair verbatims to a respective one of the categories for the respective service repair verbatims;
    a user selectively generating a report based on a key term in the component category and at least one other key term from at least one of the other respective categories, the report identifying an aggregate number of the service repair verbatims associated with the key terms selected by the user; and
    detecting an emerging service issue based on the key terms extracted from the service repair verbatims.

2. The method of claim 1 wherein the service repair verbatim is entered as uncategorized text.

3. The method of claim 2 wherein the thread of text is entered as unstructured text.

4. The method of claim 1 wherein a service personnel enters a respective verbatim into a component category.

5. The method of claim 1 wherein a service personnel enters a respective verbatim into a concern category.

6. The method of claim 1 wherein a service personnel enters a respective verbatim into a cause category.

7. The method of claim 1 wherein a service personnel enters a respective verbatim into a correction of repair category.

8. The method of claim 1 wherein key terms extracted from the verbatims relating to the concern category include customer comments explaining the concern.

9. The method of claim 1 wherein key terms extracted from the verbatims relating to the cause category include an explanation of a root cause as determined by the service personnel.

10. The method of claim 1 wherein key terms extracted from the verbatims relating to the correction of the repair include an explanation of a repair performed by the service personnel.

11. The method of claim 1 wherein the extracted key terms include text phrases extracted from the verbatims.

12. A warranty detection system for detecting trends in service repairs of vehicles, the system comprising:
    a warranty database including a memory storage unit for storing service repair verbatims, the service repair verbatims including information relating to an identified concern with the vehicle;
    a text analysis tool identifying key terms in each service repair verbatim, the identified key terms having an association with the service repair related terms in a thesaurus, the thesaurus including a plurality of service repair related terms, the service repair related terms each being associated with at least one of a component category, a concern category, a cause category, and a correction of repair category; and
    a report generating device for selectively generating reports based on selected key terms in the component category and at least one other key term from at least one of the other respective categories;
    wherein the text analysis tool extracts key terms from each service repair verbatim, and wherein the extracted key terms in each verbatim are associated with a respective category, wherein the report identifies an aggregate number of service repair verbatims associated with selected key terms from the component category and the at least one other category.

13. The system of claim 12 wherein the report includes a time trend identifying the aggregate number of verbatims over time for the selected key term from the concern category, the cause category, or the correction of repair category.

14. The system of claim 12 wherein the report includes a time trend identifying the aggregate number of verbatims over time for selected key terms from a combination of at least two of the concern category, the cause category, and the correction of repair category.

15. The system of claim 12 wherein the service repair verbatim is entered as uncategorized text.

16. The system of claim 12 wherein the service repair verbatim is entered as unstructured text.

17. The system of claim 12 wherein key terms extracted from the verbatims relating to the concern category include customer comments explaining the concern.

18. The system of claim 1 wherein key terms extracted from the verbatims relating to the cause category include an explanation of a root cause as determined by the service personnel.

19. The system of claim 1 wherein key terms extracted from the verbatims relating to the correction of the repair include an explanation of a repair performed by the service personnel.

20. The system of claim 1 wherein the extracted key terms include text phrases extracted from the verbatims.

* * * * *